Oct. 5, 1937.  J. DONNELLY, JR  2,095,059
APPARATUS FOR MEASURING AND ENLARGING SCULPTURE
Filed June 4, 1934
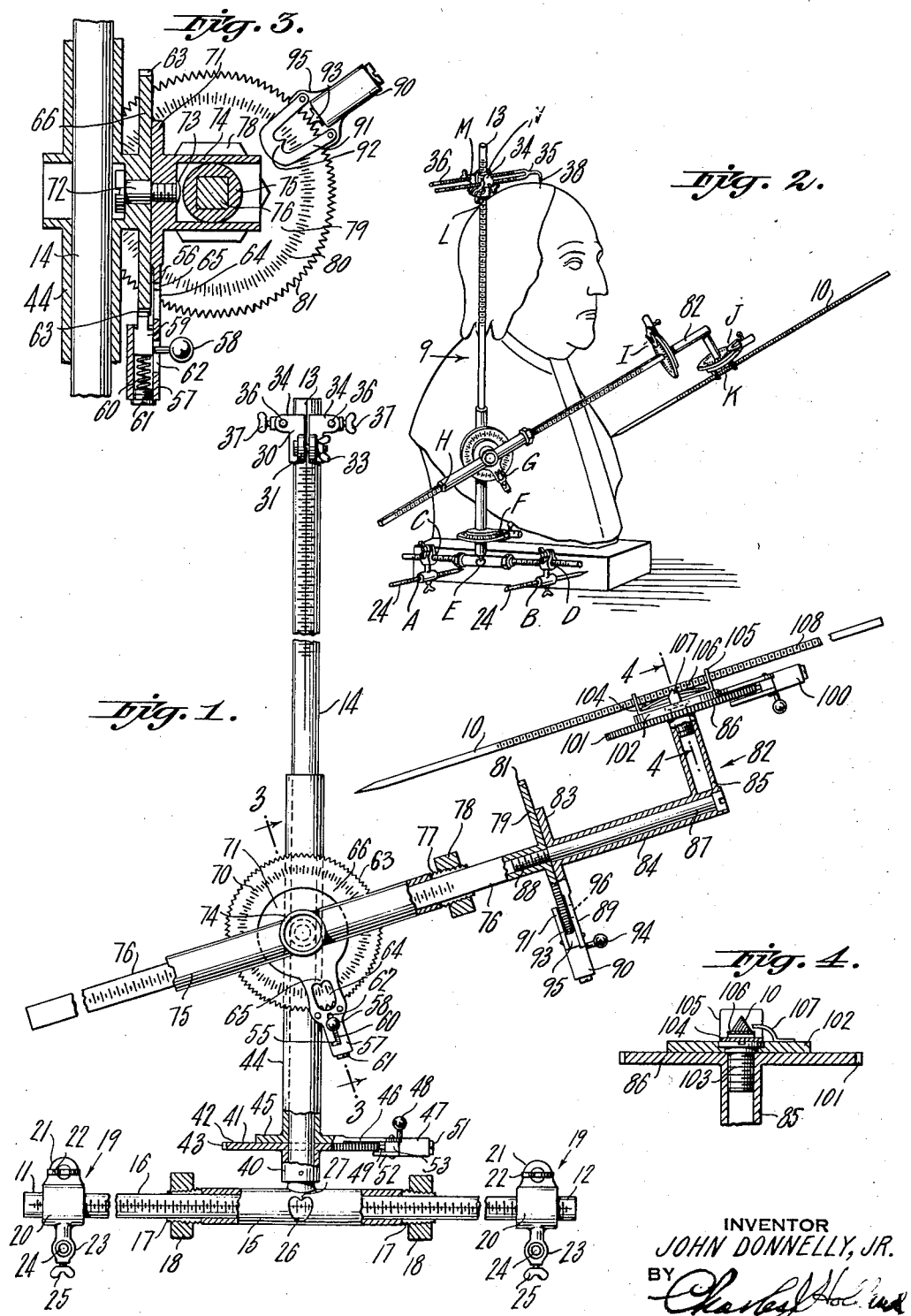
INVENTOR
JOHN DONNELLY, JR.
BY
ATTORNEY Patented Oct. 5, 1937

2,095,059

UNITED STATES PATENT OFFICE 2,095,059

APPARATUS FOR MEASURING AND ENLARGING SCULPTURE

John Donnelly, Jr., Hastings-on-Hudson, N. Y.

Application June 4, 1934, Serial No. 728,875

6 Claims. (Cl. 33—174)

This invention relates to the art of stone cutting and has for an object the provision of a novel process and device for measuring a work of sculpture and enabling the same to be carved on a larger scale in facsimile. Although the invention has particular application to the problem of facilitating the enlargement of a given model by carving in stone, the same may be applied to the art of plastic modelling and may be used not only in enlarging a given model but in duplicating the same on the same scale or even in reproducing it in miniature.

In the art of sculpture it is, of course, necessary to depict a given subject in relief and in reproducing a given work on an enlarged scale it is necessary to ascertain the precise position of certain basic points on the model with reference to a fixed point or points, and to transfer such basic points to their proportionate locations upon the body from which the work is to be carved. Heretofore, when a model was to be reproduced on a larger scale, determination of such basic points has been made by what is known as the three-arc system by means of which a given point is determined by reference to three fixed points which serve as the centers of arcs which identify the desired point at their intersection. The same procedure must be carried through for each basic point of the sculpture, and when these have all been located, for instance, by cutting thereto in a stone body, the surrounding material is cut away and shaped to an outline in likeness to the model. It need not be pointed out that this three arc measuring procedure is difficult of accomplishment and requires a great deal of painstaking work in order to achieve the precision necessary to insure the success of the system.

While it has been known to duplicate a given model by means of a measuring device comprising an upright framework on which a depth-finding pointer is adjustably mounted for movement in a plurality of planes, such process and means are limited to the production of a duplicate of the same scale as the model from which the measurements are taken. The reason for this is that the angular adjustments of such measuring devices consist of ball and socket combinations, the particular adjustment on the model being obtained by tightening thumb screws or the like to fixed ball and socket joints in position. This adjustment, once made, is not and cannot be duplicated on an enlarged scale for a ball and socket joint cannot accurately be calibrated, and consequently the precise setting of the various joints required to locate a given basic point on the model cannot be transferred or translated to the proportionate setting of a larger measuring device which will enable the same basic point to be located on the enlargement sought to be created. As a result, the devices of the prior art constructed along these principles first must be set up in position on the model, various adjustments made for the determination of a particular point and the whole device transferred to the new work for the determination of the corresponding point on the new work, which, as above indicated, must be made exactly the same size as the model. This measuring and shifting must be repeated for each point desired to be located on the new work and it is obvious that the labor entailed in making such measurements renders the entire system exceedingly tedious and difficult, notwithstanding the fact that the process and means used are totally unsuited and inoperative for making large sized facsimiles of the work under consideration.

The present invention enables the location of successive points on a given model to be accurately determined and transferred to the proportionate position required to locate such points on the body upon which the desired enlargement is to be made.

Other objects and advantages of the invention will be more clearly apparent by reference to the following specification and drawing.

The invention briefly described comprises locating a given point upon a model by a device by means of which such location can be accurately determined by reading and noting the distances and angles which are indexed on the calibrated scales of such device, and then transferring such readings to a duplicate device but enlarged to the desired proportion, and thereby locating the corresponding point on the body to be sculptured.

In the drawing is illustrated an exemplary device by means of which the novel objects and advantages of the invention may be achieved. Fig. 1 is an elevation with parts in section of such a device; Fig. 2 is a perspective view which serves to illustrate the device in place either upon the model from which measurements are to be taken or on the nearly completed statue or other sculpture to which measurements from the model are being or have been transferred; Fig. 3 is a section taken along the lines 3—3 of Fig. 1 with parts in the background shown in elevation; Fig. 4 is a section taken along the lines 4—4 of Fig. 1.

In determining the position of any given point on a model for subsequent transfer to an enlarged measuring device for the determination of a like point upon a workpiece, a depth finder 10 must be contacted against such given point and positioned at right angles to the particular surface upon which such point is contained, and such location of the given point must be determined by angular and linear measurements with great accuracy.

To afford the means for obtaining the precise position of the contacting extremity of this depth finder, the same is mounted for adjustable movement upon a T-shaped frame 9, the ends 11, 12 and 13 of which are definitely fixed in relation to the model as shown in Fig. 2. The frame 9 comprises a T-shaped structure consisting of an upright 14 rigidly secured to a cross-piece 15, the latter being conveniently constructed in the form of a sleeve through which a rod 16 may be slidably adjusted in order to adjust the upright 14 in the proper vertical plane.

The adjustment of rod 16 may be provided in any desired manner but is shown in Fig. 1 as being effected by the provision of tapered, screw-threaded, split ends 17 on the sleeve 15, which ends are compressed tightly against the rod 16 by taking up upon nuts 18. By suitable adjustment of sleeve 15 on rod 16, the upright 14 may be fixed in the desired vertical plane intermediate the ends of rod 16, which ends are equipped with adjustable clamp means 19 in order to enable the lower portion of the device to be properly positioned against the side of the model, as indicated in Fig. 2.

The adjustable clamp means 19 consists of split clamps 20 provided with flanges 21 which may be brought together by wing nuts 22 in order adjustably to clamp members 20 upon rod 16. Integrally formed with members 20 are secondary split clamps 23, disposed at right angles to clamps 20, adapted to engage styli 24. By manipulating wing nuts 25 the styli 24 may be adjusted in clamps 23 in order suitably to space the lower ends of the device from the face of the model, the styli being calibrated for this purpose. Suitable depressions (not shown) are provided in the model in order to prevent the ends of the styli from slipping out of position.

Rod 16 is provided with calibrations, as shown in Figs. 1 and 2, and sleeve 15 is provided with an opening 26 and a pointer 27 for the purpose of enabling the position of rod 16 to be determined with accuracy.

The top 13 of the frame 9 is likewise provided with a split clamp, but with one of slightly different construction. This clamp 30 is provided with flanges 31 suitably recessed to carry a bolt and a wing nut 33, which is tightened or loosened in order to adjust the position of member 30 on upright 14. The upper end of clamp 30 has integrally formed therewith, at each side thereof, secondary clamps 34, adapted to hold tong member 35. Tong member is provided with spaced legs 36 which extend through the clamps 34 and which are adjusted in proper position by means of wing nuts 37 on suitable bolts extending through the flanges of the clamps. The end of tong member 35 is pointed as shown in Fig. 2, and its point 38 rests in a suitable depression located at the topmost portion of the model.

From the construction above described it will be apparent that the frame 9 may be easily adjusted into its initial position, and a reading of the calibrated adjusting means will enable the exact position of adjustment to be determined.

Fixedly fastened to rod 14 is a sleeve 40 to the upper end of which flange 41 is integrally secured. The annular surface 42 of flange 41 is provided with calibrations (not shown) and the periphery of the flange is provided with teeth 43, there being one tooth for each calibration, for the purpose of determining the angular adjustment of member 44, as will presently appear.

Member 44 comprises a sleeve rotatably mounted on rod 14 and integrally secured to flange 45 at the bottom thereof, the flange 45 resting against flange 41 and rotating thereon with sleeve 44 when the same is turned about upright 14.

Integrally formed with flange 45 is an extension 46 at the end of which is carried a casing 47 in which is housed a spring-actuated detent 49, the detent 49 being urged between the teeth 43 of flange 41. Adjusting screw 51 may be provided in the end of the casing 47 in order to adjust the pressure exerted by the spring (not shown—the same being housed within the casing 47) upon the detent 49. Extending from the side of the casing opposite to that at which it is secured to the arm 46 is a lip 52 which extends against the other side of the flange 41 and is held in spaced relation from arm 46 by block 53. The detent 49 is provided with handle 48 by means of which it may be withdrawn from engagement with the teeth 43. This construction enables the sleeve 44 to be rotated to any desired angle with respect to the flange 41, the detent being withdrawn from engagement with the teeth 43 during this period of adjustment. When the adjustment is made, the spring within the casing 47 seats the detent between the teeth 43 and definitely fixes the angle at which the sleeve 44 has been turned. The construction of the angle-adjusting device is the same as, and will more clearly be seen in connection with that which is provided for flange 66 secured to the upper end of the sleeve 44 to which reference will now be made.

This construction will be perceived in Figs. 1 and 3 in which it is shown that flange 66 is integrally formed adjacent the upper end of the sleeve 44 and provided with the flange member 71 for rotation thereon. Member 71 may be mounted for rotation within the periphery of the flange 66 by providing a screw 72 centrally of flange 66 and extending through a suitable opening in the center of member 71, the screw being beaded down at its end 73 in order firmly to secure the member 71 for rotation about its pivot 72. Flange 66 is provided with teeth 63 into which a detent 59 is urged by the pressure of spring 60 held in place in casing 57 between the detent and the adjusting screw 61. Detent 59, like detent 49, is provided with a handle 58 in order to allow it to be withdrawn from engagement between the teeth 63 against the pressure of the spring 60. Casing 57 is provided with an opening 62 to enable this purpose to be accomplished, the opening being provided with a cross slot 55 for the purpose of enabling detent 59 to be disengaged from teeth 63 during periods of adjustment. The arm 56, which connects the casing 57 with the flange member 71, is also provided with an opening 64 to enable the calibrated scale 70 on flange 66 to be read. This is facilitated by pointer 65 (Figs. 1 and 3) provided in the opening 64. The angle-adjusting device just described is the same as that described in connection with the flanges 41 and 45 with the exception that the adjusting device on flange 71 does not require a lip contacting against the other side of the toothed flange 66.

Integrally secured to the upper face of member 71 is a holding member 74 through which and in which is secured a sleeve 75 disposed at right angles thereto. In this sleeve is housed a non-circular bar 76 mounted thereon for slidable movement in the sleeve. The end of the sleeve 75, as will be apparent from an inspection of Fig. 1, is provided with a tapered screw-threaded split end 77 upon which nut 78 is adapted to be taken up in order to fix the position of the rod 76 with respect to the sleeve 75. The end of rod 76 is provided with a flange 79 having teeth 81.

Mounted for rotation about the center of flange 79 is an elbow member 82 which consists of a unitary structure comprised of flange 83, sleeves 84 and 85, and flange 86. The flange 83 of this structure is brought against the face of the flange 79 and rotated about the center of said flange by means of a bolt 87 extending through the sleeve 84 and secured in internal threads 88 provided in the hollow end of the member 76. An angle-adjusting structure similar to that described in connection with flanges 41, 45, 66 and 71 is provided in connection with flanges 83 and 79 and consists of an integral arm 89, casing 90, detent 93, handle 94, spacing block 95, and opposite side index 91. This latter may clearly be perceived in Figs. 1 and 3, the same having pointer 92 to enable the scale 80 upon flange 79 to be read from this side. Arm 89 is constructed similarly to arm 56 of flange 71 and is provided with an opening 96 through which the scale of the opposite side of flange 79 may be read.

To the end of the sleeve 85 is affixed flange 86 and mounted for rotation about the center of this flange is a flange 102. This may be accomplished by seating the head of screw 103 in a suitable opening in flange 102 and screwing it into the hollow end of the sleeve 85, as shown in Fig. 4. Angle-adjusting means 100, similar to that described in connection with the mutually coacting flanges previously alluded to, is provided upon member 102, the detent coacting with the teeth 101 upon flange 86.

Secured to the top of member 102 is a bracket 104, the ends 105 of which are upturned at right angles thereto and provided with an orifice (in the instance illustrated, an orifice of triangular shape) for the reception of depth finder 10. This depth finder, calibrated as at 108, may be mounted for adjustment in bracket 104 by means of leaf spring 106 provided intermediate the upturned ends 105 of the bracket and arranged to exert pressure against the under side of the depth finder 10. Pointer 107 may be fixed to bracket 104 in order to index the position of the depth finder 10.

In operation the various adjustments of the device described are made in order to fix the depth finder of the pointing device at right angles to the surface of the model at a particular point desired to be measured. Linear readings are then taken at A, B, C, D and E, H, K, L, M and N, and at the same time angular readings are observed at F, G, I and J. These readings are then transferred to a similar but larger pointing device mounted upon the workpiece, by setting the parts of the duplicate device in the precise relative positions found upon its similarly calibrated scales, and the material in the workpiece cut away until the depth finder can be positioned the correct distance away from the point, the relative location of which has been definitely determined from the smaller device. In Fig. 2 an illustrative position of the device is shown in order to indicate the manner in which measurements are taken from the model. Of course, Fig. 2 will also show how the larger device is positioned similarly upon the nearly completed bust.

The device shown has been chosen merely for the purpose of depicting one way in which the principles of the invention may be utilized, and it should be understood that various changes in and modifications of this device may be made without departing from the scope of the invention.

By use of the principles disclosed, the enlargement and transfer of measurements from the model to the body to be carved or otherwise shaped is thus very easily accomplished, without the necessity of the complicated measurements and calculations required in the intersection of arcs, and with the elimination of the inaccuracies inherent in the use of the three-arc system. The time required to translate the cardinal points of a model to the stone or other body to be shaped is very appreciably reduced with a concomitant saving in labor and an increase of the efficiency with which a given job may be accomplished. The process and apparatus may be used not only for enlargement, but for duplication on the same scale, with great advantage as compared to the processes and devices of the prior art, and if desired they may be utilized in copying a given work on a reduced scale. These and other advantages and applications of the invention will be readily apparent to those skilled in the art, and it is to be understood that such changes as may seem expedient in the utilization of such advantages and applications may well be made without departing from the scope of the invention.

What I claim is:

1. A pointing device comprising the combination with a frame adapted to be mounted upon a model of sculpture, of a depth-finding pointer connected to said frame by a plurality of members linearly adjustable with relation to said frame, and angularly adjustable therewith to permit the free rotation of said pointer in more than one plane, and means associated with said members for indexing the precise linear and angular positions to which said members are adjusted.

2. A pointing device comprising the combination with a frame adapted to be mounted upon a model of sculpture, of a depth-finding pointer connected to said frame by a plurality of members linearly and angularly adjustable with relation to said frame, and means associated with said members for indexing the precise linear and angular positions to which said members are adjusted, said connections permitting the free angular adjustment of said pointer in at least two separate planes.

3. A device for locating basic points upon a workpiece to be sculptured, comprising a frame, a member secured to said frame substantially laterally thereto and having a downwardly depending end adapted to rest on the top of the workpiece and to dispose the frame against the side thereof, said frame having a pointer disposed thereon through intermediate members in adjustable relation therewith, and means associated with said intermediate members for measuring the angles and distances of said members from a fixed point upon said frame.

4. A device for locating basic points on a workpiece adapted to be sculptured, comprising a frame, means for hanging said frame upon the work-piece, a depth-finding pointer, a plurality of members connecting said pointer to said frame to permit the free angular adjustment of said pointer in at least two planes, and means disposed on said connecting members for accurately determining the precise position to which each said member is adjusted.

5. A sculpturing device comprising a frame, means for hanging said frame on a work-piece adapted to be sculptured, a depth-finding pointer, adjustable members connecting said pointer to said frame whereby said pointer is movable throughout an angle of at least 90° in more than one plane, and calibrated scales and index means associated with said connecting members.

6. A sculpturing device comprising a frame, means for hanging the frame upon a work-piece adapted to be sculptured, a pointer mounted on said frame, a plurality of members rotatably and slidably connected with each other and connecting said pointer to said frame and permitting the angular adjustment of said pointer in at least two planes, and means disposed on said connecting members for measuring the precise linear and angular relationship of said members when the same have been adjusted to bring the pointer adjacent a given point on the work-piece.

JOHN DONNELLY, Jr.